United States Patent

Ozutsumi et al.

[11] 4,073,614
[45] Feb. 14, 1978

[54] MIXTURE OF BENZONAZINES AND BENZODIOXANES WHICH MAY BE USED AS COLOR FARMERS

[75] Inventors: Minoru Ozutsumi; Yoshihide Miyazawa; Masahiko Yamaguchi, all of Tokyo, Japan

[73] Assignee: Hodogaya Chemical Co., Ltd., Tokyo, Japan

[21] Appl. No.: 594,173

[22] Filed: July 8, 1975

[30] Foreign Application Priority Data

July 8, 1974   Japan ................... 49-77348

[51] Int. Cl.$^2$ .................. D06P 1/00; D06P 3/00; C07D 265/00; C07D 273/00
[52] U.S. Cl. ...................... 8/25; 260/340.7; 544/92
[58] Field of Search ............ 260/244 R, 340.7; 8/25

[56] References Cited

U.S. PATENT DOCUMENTS

| | | | |
|---|---|---|---|
| 3,006,917 | 10/1961 | Seeger | 260/244 |
| 3,244,549 | 4/1966 | Farnham et al. | 117/36.2 |
| 3,684,549 | 8/1972 | Shank | 117/36.2 |
| 3,967,835 | 7/1976 | Ozutsumi et al. | 282/27.5 |

FOREIGN PATENT DOCUMENTS 1,135,465   11/1959   Germany .............. 260/244

Primary Examiner—Albert T. Meyers
Assistant Examiner—Douglas W. Robinson
Attorney, Agent, or Firm—Sughrue, Rothwell, Mion, Zinn and Macpeak

[57] ABSTRACT

A mixture of a triphenylmethane compound represented by the formula (Ia)

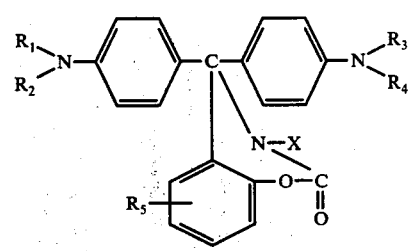

(Ia)

and a triphenylmethane compound represented by the formula (Ib)

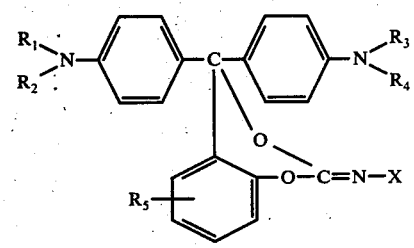

(Ib)

wherein $R_1$, $R_2$, $R_3$, $R_4$, $R_5$ and X are as defined hereinafter, useful as a color former.

1 Claim, No Drawings

MIXTURE OF BENZONAZINES AND BENZODIOXANES WHICH MAY BE USED AS COLOR FARMERS

BACKGROUND OF THE INVENTION

1. Field of the Invention

This invention relates to novel triphenylmethane compounds which are useful as color formers.

2. Description of the Prior Art

Color formers hitherto known include rapid-developing color formers which develop a color rapidly and slow-developing color formers which develop a color slowly when they are adsorbed on acidic substances. Examples of rapid-developing color formers are triarylmethane lactones such as Crystal Violet Lactone, Malachite Green Lactone and 3,3-bis(1',2'-dimethylindol-3'-yl) phthalide, etc., leuco Auramines such as N-bis(4'-dimethylaminophenyl)methylaniline, xanthene lactones such as 3-diethylamino-7-methylaminofluoran, 3-diethylamino-6-chlorofluoran and 3-diethylamino-6-benzylaminofluoran, etc., xanthene lactams such as Rhodamine-N-anilino lactam, indolino-spiropyrans such as 1,3,3-trimethylindolino-β-naphthospiropyran and the like. These rapid-developing color formers are disadvantages in that they develop a color or are decomposed during storage resulting in a decreased color developing capability and that the colors developed have inferior light-fastness and water-resistance and also changes occur in the colors developed with the lapse of time. Examples of slow-developing color formers include Leucomethylene Blue compounds such as N-benzoyl Leucomethylene Blue. Although these color formers have excellent light-fastness, and water-resistance after color formation, they still have disadvantages in that a color develops upon exposure to light or the compounds are decomposed during storage whereby the color developing capability is decreased.

SUMMARY OF THE INVENTION

An object of this invention is to provide novel triphenylmethane compounds represented by the formula (Ia) or (Ib)

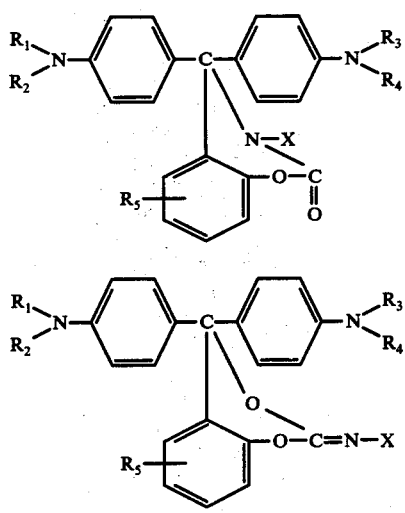

or a mixture thereof, wherein $R_1$ and $R_3$, which may be the same or different, each represents a lower alkyl group having 1 to 4 carbon atoms, a benzyl group or a phenyl group, in which the aromatic nucleus of the benzyl or phenyl group may be substituted with a lower alkyl group having 1 to 4 carbon atoms, a lower alkoxy group having 1 to 4 carbon atoms or a di-lower alkylamino group in which each of the lower alkyl moieties thereof have 1 to 4 carbon atoms; $R_2$ and $R_4$, which may be the same or different, each represents a hydrogen atom, a lower alkyl group having 1 to 4 carbon atoms, a benzyl group or a phenyl group, in which the aromatic nucleus of the benzyl or phenyl group may be substituted with a halogen atom or a di-lower alkylamino group, in which each of the lower alkyl moieties thereof have 1 to 4 carbon atoms; $R_5$ represents a hydrogen atom, a lower alkyl group having 1 to 4 carbon atoms, a lower alkoxy group having 1 to 4 carbon atoms, a halogen atom, a di-lower alkylamino group in which each of the lower alkyl moieties thereof have 1 to 4 carbon atoms, a dibenzylamino group, an N-lower alkyl-N-benzylamino group having 1 to 4 carbon atoms in the lower alkyl moiety thereof or an N-lower alkyl-N-phenylamino group having 1 to 4 carbon atoms in the lower alkyl moiety thereof, in which the aromatic nucleus of the benzylamino and phenylamino groups may be substituted with a halogen atom, a lower alkyl group having 1 to 4 carbon atoms, or a lower alkoxy group having 1 to 4 carbon atoms; and X represents a lower alkyl group having 1 to 4 carbon atoms, a lower alkenyl group having 2 to 4 carbon atoms, a cyclohexyl group, an aralkyl group having 1 to 4 carbon atoms in the alkyl moiety thereof or an aryl group, in which the aromatic nucleus of the aralkyl and the aryl groups may be substituted with a lower alkyl group having 1 to 4 carbon atoms, a lower alkoxy group having 1 to 4 carbon atoms, a di-lower alkylamino group having 1 to 4 carbon atoms in each of the lower alkyl moieties thereof, a halogen atom, a nitro group, and when the aralkyl group is a benzyl group, the aromatic nucleus thereof may also be substituted with an N-lower alkyl-N-phenyl group having 1 to 4 carbon atoms in the N-lower alkyl moiety thereof, useful as a color former.

DETAILED DESCRIPTION OF THE INVENTION

In the above general formulae (Ia) and (Ib) suitable examples of lower alkyl groups having 1 to 4 carbon atoms include methyl, ethyl, propyl, iso-propyl, n-butyl, sec-butyl and tert-butyl groups. Suitable examples of lower alkoxy groups having 1 to 4 carbon atoms include methoxy, ethoxy, propoxy, iso-propoxy, n-butoxy, sec-butoxy and tert-butoxy. Suitable examples of di-lower alkylamino groups having 1 to 4 carbon atoms in each of the alkyl moieties thereof include N,N-dimethylamino, N-methyl-N-ethylamino, N-ethyl-N-isopropylamino, N-methyl-N-butylamino, etc., groups. Typical examples of halogen atoms which can be employed are chlorine, bromine, and iodine atoms. Suitable example of N-lower alkyl-N-benzyl groups include N-methyl-N-benzyl, N-ethyl-N-benzyl, N-propyl-N-benzyl, etc., groups. Suitable examples of N-lower alkyl-N-phenyl groups include N-methyl-N-phenyl, N-ethyl-N-phenyl, N-propyl-N-phenyl, etc., groups. In addition, suitable examples of N-lower alkyl-N-benzylamino groups include N-methyl-N-benzylamino, N-ethyl-N-benzylamino, N-propyl-N-benzylamino groups, and suitable examples of N-lower alkyl-N-phenylamino groups include N-methyl-N-phenylamino, N-ethyl-N-phenylamino, N-n-propyl-N-phenylamino groups, etc. Typical examples of alkenyl groups having 2 to 4 carbon atoms include ethenyl, propenyl, 1-butenyl and 2-butenyl groups. Suitable examples of aralkyl groups include benzyl, phenethyl, phenylpropyl, etc., groups. Suitable examples of aryl groups include phenyl and naphthyl groups.

The triphenylmethane compound represented by the formula (Ia), (Ib) or a mixture thereof as described above can be prepared by oxidizing a triphenylmethane derivative represented by the formula (II)

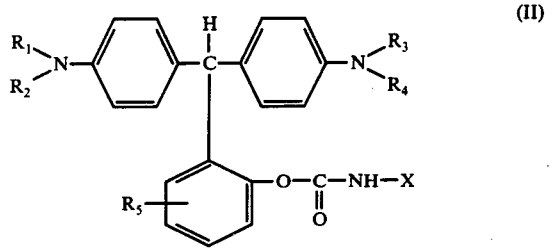

wherein $R_1$, $R_2$, $R_3$, $R_4$, $R_5$ and X are as defined above followed by an alkali treatment.

The triphenylmethane derivatives having the formula (II) which can be used for the preparation of the color former of the present invention can be prepared according to the processes described below.

1. 1 mole of a 4-substituted-amino-4'-substituted-aminobenzhydrol and 1 to 1.5 moles of a substituted phenol are reacted in a volatile solvent, such as methanol, ethanol, benzene, toluene or water and the like, in the presence of a condensing agent, such as hydrochloric acid, sulfuric acid, boric acid, zinc chloride, aluminum chloride, and the like, at a temperature of from 20° to 110° C for a period of from 2 to 10 hours to obtain a crystalline (4-substituted-aminophenyl)-4-substituted-aminophenyl)-(2-hydroxy-substituted-phenyl)-methane.

1 mole of the thus obtained compound and 0.9 to 1.2 moles of an isocyanate compound, e.g., an isocyanate compound having the formula X-NCO wherein X is as described herein, are then reacted in a volatile inert organic solvent, such as benzene, toluene, a chlorobenzene and the like, and if desired, in the presence of a small amount of a volatile tertiary amine, e.g., having 1 to 4 carbon atoms in each of the alkylmoieties thereof such as triethylamine, as a catalyst at a temperature of from 20° to 110° C for 1 to 5 hours to obtain a crystalline (4-substituted-aminophenyl)-(4-substituted-aminophenyl)-(2-N-substituted-carbamoyloxy-substitued-phenyl)-methane. If desired, the thus obtained crystal may be recrystallized.

2. 1 mole of a 4-substituted-amino-4'-substituted-aminobenzhydrol and 1 to 1.5 moles of an N-substituted-carbamoyloxy-substituted-benzene are reacted in the same solvent as described in (1) above in the presence of the same condensing agent as described in (1) above at 20° C to 100° C for 2 to 10 hours to obtain a crystalline (4-substituted-aminophenyl)-(4-substituted-aminophenyl)-(2-N-substituted-carbamoyloxy-substituted-phenyl)-methane. If desired, the product may be recrystallized.

3. 2 moles of an N-substituted-aniline and 0.9 to 1.1 moles of a substituted-salicylaldehyde are reacted in the presence of urea 1 to 1.5 moles of zinc chloride at a temperature of 50° to 120° C for 5 to 15 hours to obtain a crystalline (4-substituted-aminophenyl)-(4-substituted-aminophenyl)-(2-hydroxy-substituted-phenyl)-methane. If desired, the product may be recrystallized.

1 mole of the thus obtained product and 0.9 to 1.2 moles of an isocyanate compound (e.g., as described in (1) above are then reacted in the same manner as described in (1) above to obtain a crystalline (4-substituted-aminophenyl)-(4-substituted-aminophenyl)-(2-N-substituted-carbamoyloxy-substituted-phenyl)-methane. If desired, the product may be recrystallized.

4. 2 moles of a substituted-aniline and 0.9 to 1.1 moles of a 2-N-substituted-carbamoyloxy-substituted-benzaldehyde are reacted in the same manner as described in (3) above to obtain a crystalline (4-substituted-aminophenyl)-(4-substituted-aminophenyl)-(2-N-substituted-carbamoyloxy-substituted-phenyl)-methane. If desired, the product may be recrystallized.

5. 1 mole of a 4-substituted-amino-4'-substituted-amino-substituted-benzophenone and 0.9 to 1.3 moles of a substitutedphenol are reacted in phosphorus oxychloride at a temperature of 30° to 90° C for 1 to 5 hours to obtain a crystalline (4-substituted-aminophenyl)-(4 -substituted-aminophenyl)-(2-hydroxy-substituted-phenyl)-methane.

1 mole of the thus obtained compound and 0.9 to 1.2 moles of an isocyanate compound (e.g., as described in (1) above are then reacted in the same manner as described in (1) above to obtain a crystalline (4-substituted-aminophenyl)-(4-substituted-aminophenyl)-(2-N-substituted-carbamoyloxy-substituted-phenyl)-methane. If desired, the product may be recrystallized.

6. 1 mole of a 4-substituted-amino-4'-substituted-amino-benzophenone and 0.9 to 1.1 moles of a 2-N-substituted-carbamoyloxy-substituted-benzaldehyde are reacted in the same manner as described in (5) to obtain a crystalline (4-substituted-aminophenyl)-(4-substituted-aminophenyl)-(2-N-substituted-carbamoyloxy-substituted-phenyl)-methane. If desired, the product may be recrystallized.

7. 1 mole of a 4'-substituted-amino-2-hydroxy-substituted-benzophenone and 0.9 to 1.5 moles of a substituted-aniline are reacted in the presence of phosphorous oxychloride at a temperature of 20° to 100° C for 2 to 8 hours to obtain a crystalline (4-substituted-aminophenyl)-(4-substituted-aminophenyl)-2-hydroxy-substituted-phenyl)-methane. If desired, the product may be recrystallized.

1 mole of the thus obtained compound and 0.9 to 1 mole of an isocyanate compound (e.g., as described in (1) above are then reacted in the same manner as described in (1) above to obtain a crystalline (4-substituted-aminophenyl)-(4-substituted-aminophenyl)-(2-N-substituted-carbamoyloxy-substituted-phenyl)-methane. If desired, the product may be recrystallized.

8. 1 mole of a 4'-substituted-amino-2-N-substituted-carbamoyloxy-substituted-benzophenone and 0.9 to 1.5 moles of a substituted-aniline are reacted in the presence of phosphorus oxychloride in the same manner as described in (7) above to obtain a crystalline (4-substituted-aminophenyl)-(4-substituted-aminophenyl)-(2-N-substituted-carbamoyloxy-substituted-phenyl)-methane. If desired, the product may be recrystallized.

Of these processes for preparing the triphenylmethane derivatives, a preferred process is the process as described in (1) above.

Representative triphenylmethane color formers represented by the formula (Ia), (Ib) or a mixture thereof according to the present invention are those prepared from the following triphenylmethane derivatives of the formula (II) as shown in Table I below.

Table I
| R₁ | R₂ | R₃ | R₄ | X | R₅ Substituent | Substituent Position |
|---|---|---|---|---|---|---|
| —CH₃ | —CH₃ | —CH₃ | —CH₃ | —CH₃ | H | |
| " | " | " | " | —CH₂=CHCH₂ | H | |
| " | " | " | " | —CH₂—C₆H₅ | H | |
| " | " | " | " | —CH₂—(1-naphthyl) | H | |
| " | " | " | " | —CH₂—(2-naphthyl) | H | |
| " | " | " | " | —CH₂—C₆H₄Cl | H | |
| " | " | " | " | —CH₂—(4-methyl-1-naphthyl) | H | |
| " | " | " | " | —C₄H₉-(n) | H | |
| " | " | " | " | —C₄H₉-(i) | H | |

Table I-continued

| R₁ | R₂ | R₃ | R₄ | X | R₅ Substituent | Substituent Position |
|---|---|---|---|---|---|---|
| | " | " | " | cyclohexyl | H | |
| | " | " | " | —CH₂CH₂—phenyl | H | |
| | " | " | " | —CH₂CH₂—(4-Cl-phenyl) | H | |
| | " | " | " | —CH₂—(4-(N(CH₃)(C₂H₅))-phenyl)—N(CH₃)(phenyl) | H | |
| —CH₂—phenyl | " | —CH₂— | " | —CH₃ | H | |
| 4-CH₃-phenyl | " | 4-CH₃-phenyl | " | —C₂H₅ | H | |
| 4-OCH₃-phenyl | " | 4-OCH₃-phenyl | " | phenyl | H | |
| 4-(N(CH₃)₂)-phenyl | " | 4-(N(CH₃)₂)-phenyl | " | | H | |

Table I-continued
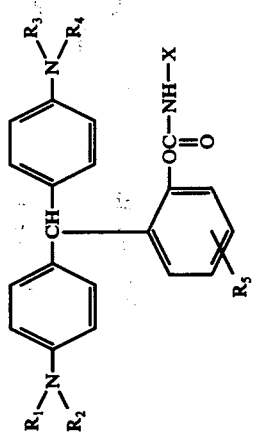
| $R_1$ | $R_2$ | $R_3$ | $R_4$ | X | $R_5$ Substituent | Substituent Position |
|---|---|---|---|---|---|---|
| —$CH_3$ | " | —$CH_3$ | " | —$CH_3$ | —N($C_2H_5$)($C_2H_5$) | 4-position |
| " | " | " | " | —$C_4H_9(n)$ | " | " |
| " | " | " | " | cyclohexyl | " | " |
| " | " | " | " | —$CH_2$—phenyl | " | " |
| " | " | " | " | phenyl | " | " |
| " | " | " | " | 4-Cl-phenyl | " | " |
| —$C_2H_5$ | —$C_2H_5$ | —$C_2H_5$ | —$C_2H_5$ | 2-$NO_2$-phenyl | —$CH_3$, —$CH_3$ | 4-position, 5-position |
| —$CH_3$ | —$CH_3$ | —$CH_3$ | —$CH_3$ | 3-[N($CH_3$)($CH_3$)]-phenyl | —N($CH_3$)($CH_3$) | 4-position |

Table I-continued
| R₁ | R₂ | R₃ | R₄ | X | R₅ Substituent | Substituent Position |
|---|---|---|---|---|---|---|
| " | " | " | " | 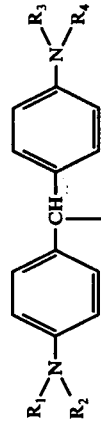 (p-tolyl) | —N(C₂H₅)₂ | 5-position |
| " | " | " | " | 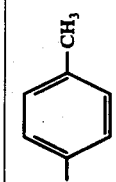 (1-methylnaphthyl) | " | " |
| " | " | " | " | 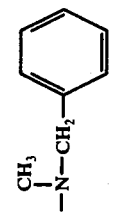 (p-methoxyphenyl) | 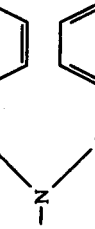 | " |
| " | " | " | " | 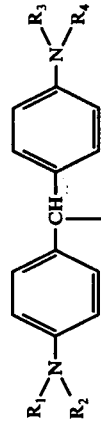 | 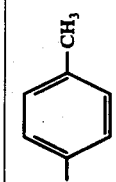 | " |
| —C₂H₅ | —C₂H₅ | —C₂H₅ | —C₂H₅ | | 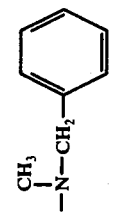 | " |
| —CH₃ | —CH₃ | —CH₃ | —CH₃ | | 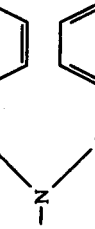 | " |

Table I-continued
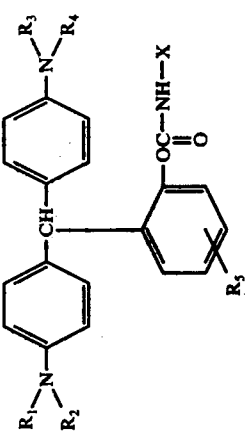
| $R_1$ | $R_2$ | $R_3$ | $R_4$ | X | $R_5$ Substituent | Substituent Position |
|---|---|---|---|---|---|---|
| —C₄H₉(n) | " | —C₄H₉(n) | " | " | -) | " |
| —CH₃ | " | —CH₃ | " | " | —OCH₃ | 4-position |
| " | " | " | " | " | Cl, Cl | 4-position, 5-position |
| " | " | " | " | ![biphenyl-CH2-] | —OC₂H₅ | 4-position |
| " | " | " | " | ![1-Cl-naphthyl] | —N(CH₃)₂ | " |
| " | —H | " | —H | ![phenyl] | " | " |
| ![C6H5-CH2-] | ![C6H5-] | ![C6H5-CH2-] | ![C6H5-] | —CH₃ | " | " |
| " | —CH₃ | " | —CH₃ | ![cyclohexyl-H] | —OCH₃ | " |

Table I-continued

Structure:

$$\underset{R_2}{\overset{R_1}{N}}{-}\underset{}{\phantom{X}}\text{-C}_6\text{H}_4\text{-CH}(\text{-C}_6\text{H}_4\text{-N}\underset{R_4}{\overset{R_3}{}})(\text{-C}_6\text{H}_3(R_5)\text{-OC(=O)NH-X})$$

| $R_1$ | $R_2$ | $R_3$ | $R_4$ | X | $R_5$ Substituent | Substituent Position |
|---|---|---|---|---|---|---|
| $-CH_3$ | 4-Cl-C$_6$H$_4$-, $-CH_3$ | $-CH_3$ | 4-Cl-C$_6$H$_4$-, $-CH_3$ | $-CH_3$ | $-N(CH_3)_2$ | " |
| $-C_6H_5$ | $-CH_3$ | $-C_2H_5$ | $-CH_3$ | $-C_6H_5$ | $-N(CH_3)(C_2H_5)$ | " |
| $-C_6H_5$ | " | " | " | $-C_2H_5$ | $-N(CH_3)_2$ | 4-position |
| $-CH_2-C_6H_5$ | $-CH_2-C_6H_5$ | $-CH_2-C_6H_5$ | $-C_6H_5$, $-CH_3$ | $-CH_3$ | " | " |
| " | " | $-CH_3$ | " | $-C_2H_5$ | " | " |
| " | " | " | " | " | $-N(CH_3)$-(4-CH$_3$-C$_6$H$_4$) | " |
| " | $-C_2H_5$ | " | $-C_2H_5$ | $-CH_3$ | $-N(CH_3)$-(2-Cl-C$_6$H$_4$) | " |
| " | " | " | " | " | $-N(CH_3)$-CH$_2$-(4-Cl-C$_6$H$_4$) | " |

Table I-continued

Structure:

Ar-CH(C₆H₄-NR₁R₂)(C₆H₄-NR₃R₄) with pendant phenyl bearing -OC(O)-NH-X and R₅ substituent

| R₁ | R₂ | R₃ | R₄ | X | R₅ Substituent | Substituent Position |
|----|----|----|----|----|----------------|---------------------|
| " | 4-Cl-C₆H₄-CH₂- | " | 4-Cl-C₆H₄-CH₂- | phenyl (H) | -OCH₃ | " |
| " | 4-(N(CH₃)₂)-C₆H₄-CH₂- | " | 4-(N(CH₃)₂)-C₆H₄-CH₂- | 4-CH₃-C₆H₄- | -N(CH₃)₂ | " |

The novel color former obtained according to the present invention is a substantially colorless or slightly colored powder which is stable in the atmosphere but changes in color from purple to green upon heating. The powder is soluble in or miscible with natural or synthetic high molecular weight compounds such as animal, vegetable and mineral waxes, ethyl cellulose, polyvinyl acetate, rosin-modified alkyd resins and the like, and is also soluble in a wide variety of organic liquids such as methanol, ethanol, ethyl Cellosolve, chloroform, benzene, toluene, chlorobenzenes, alkylnaphthalenes, benzyltoluene, dibenzyltoluene, dibenzylbenzene, trioctylphosphate and the like, and mixtures thereof. A solution of the color former in an organic liquid as described above is adsorbed onto an active clay substance such as acid clay, attapulgite, zeolite, bentonite and the like, an organic solid acid such as succinic acid, maleic acid, tannic acid, benzoic acid and the like and an acidic polymer such as carboxypolyethylene, a phenol-aldehyde copolymer, a styrene-maleic anhydride copolymer containing a free acidic group and the like thereby developing a purple to green color. The color thus developed has a high color density and has excellent light-fastness, water-resistance and anti-sublimation properties. Therefore, the color formers of this invention are useful as a marking color former for recording materials such as heat-sensitive copying papers, hectographic printing papers, pressure-sensitive copying papers, papers for use in facsimile systems, etc.

The color formers of the formula (Ia), (Ib) or a mixture thereof according to the present invention can be prepared as follows:

A triphenylmethane derivative of the formula (II) is dispersed or dissolved in water or a volatile inert organic solvent, such as methanol, ethanol, benzene, toluene, a chlorobenzene, and the like, preferably dissolved in a volatile inert organic solvent as described above, and the resulting dispersion or solution is oxidized using an inorganic oxidizing agent, such as hydrogen peroxide, manganese dioxide, lead peroxide, hypochlorous acid and the like, or an organic oxidizing agent, such as chloranil, p-benzoquinone, anthraquinone and the like, with an organic oxidizing agent being preferred. A suitable amount of the oxidizing agent can range from about 0.7 to 2, preferably 0.9 to 1.5 mol, per mole of the triphenylmethane derivative of the formula (II). Subsequently, the reaction mixture is treated with an aqueous solution of an inorganic basic compound, such as sodium hydroxide, sodium carbonate or sodium bicarbonate and the like, or an organic basic compound, such as triethylamine, triethanolamine and the like, with an inorganic basic compound being preferred, i.e., the reaction mixture is simply rendered alkaline, to obtain a compound of the formula (Ia), (Ib) or a mixture thereof.

A preferred embodiment of the above preparation is illustrated below:

1 mole of a triphenylmethane derivative having the formula (II) is dissolved in 0.5 to 2.5 liter of benzene, toluene or a chlorobenzene. 0.4 to 0.7 moles of chloranil or p-benzoquinone is added to the resulting solution, and the mixture is stirred at a temperature of 15° to 90° C for 0.5 to 7 hours. After the reaction mixture is cooled to room temperature (i.e., about 20°–30° C), a dilute aqueous solution of sodium hydroxide is added thereto to adjust the pH of the mixture to 10 to 12. The benzene, toluene or chlorobenzene layer is separated and then washed with water followed by distillation to remove the benzene, toluene or chlorobenzene whereby a substantially colorless or slightly colored color former represented by the formula (Ia), (Ib) or a mixture thereof is obtained as crystals. The proportion of the color former of the formula (Ia) to the color former of the formula (Ib) varies depending upon the chemical structure of the color former obtained, the process employed for the preparation thereof and the like, but regardless of the proportion, any color former according to the present invention can be used.

If desired, the color former thus obtained can be repeatedly recrystallized using a solvent, such as methanol, ethanol, benzene, toluene or a mixture thereof, to obtain the desired compound having either of the formula (Ia) or (Ib) in high purity.

Typical processes for preparing the triphenylmethane derivative represented by the formula (II) are given below as Reference Examples. Unless otherwise indicated herein, all parts, percents, ratios and the like are by weight.

REFERENCE EXAMPLE 1

Preparation of bis(4-Dimethylaminophenyl)-[2-(N-phenyl)carbamoyloxy-4-diethylaminophenyl]-methane To an aqueous solution of 20 ml of concentrated hydrochloric acid, 100 ml of water and 17 ml of methanol were added 20 g of 4,4'-bis(dimethylamino)benzhydrol followed by 13.5 g of 3-dimethylaminophenol. The resulting solution was allowed to react at 70° to 80° C for 5 hours while stirring. After completion of the reaction, the reaction mixture was cooled to room temperature and adjusted to a pH of 10 to 11 with a dilute aqueous solution of sodium hydroxide. The precipitate thus formed was filtered, washed with water and dried to obtain 30.6 g of a blue solid. The solid was recrystallized from a benzene-ethanol solution (2:1 by volume) to obtain 24.7 g of bis(4-dimethylaminophenyl)-(2-hydroxy-4-diethylaminophenyl)-methane as pale blue crystals having a melting point of 94 to 95° C.

12 g of the above obtained bis(4-dimethylaminophenyl)-(2-hydroxy-4-diethylaminophenyl)-methane was added to 50 ml of toluene, and 10 drops of triethylamine were then added thereto. 3.8 g of phenyl isocyanate was added to the solution, and the resulting mixture was allowed to react at a temperature of 40 to 45° C for 1 hour. After completion of the reaction, the mixture was cooled to 5° to 10° C. The precipitate formed was filtered and recrystallized from toluene to obtain 18.7 g of bis(4-dimethylaminophenyl)-[2-(N-phenyl)carbamoyloxy-4-diethylaminophenyl]-methane as substantially colorless crystals having a melting point of 145° to 146° C.

REFERENCE EXAMPLE 2

Preparation of bis(4-Dimethylaminophenyl)-[2-(N-methyl)carbamoyloxy-4-diethylaminophenyl]-methane 5.4 g of 4,4'-bis(dimethylamino)benzhydrol was dissolved in 20 ml of methanol. To the resulting solution was added 5.1 g of 3-(N-methyl)carbamoyloxydiethylaniline while bubbling dried hydrogen chloride therethrough, and the mixture was allowed to react at a temperature of 40° to 45° C for 7 hours. After completion of the reaction, the mixture was cooled to room temperature and then made weakly alkaline with a dilute aqueous solution of sodium carbonate. The precipitate thus formed was filtered, washed with water, dried and then recrystallized from toluene to obtain 4.3 g of bis(4-dimethylaminophenyl)-[2-(N-methyl)-carbamoyloxy-4-diethylaminophenyl]-methane as pale blue crystals having a melting point of 142° to 144° C.

REFERENCE EXAMPLE 3

Preparation of bis(4-Methylaminophenyl)-[2-(N-phenyl)carbamoyloxy-4-dimethylaminophenyl]-methane 11 g of N-methylaniline, 15.0 g of 2-(N-phenyl)carbamoyloxy-4-dimethylaminobenzaldehyde, 7.0 g of zinc chloride and 3.0 g of urea were added to 200 ml of water, and the resulting mixture was allowed to react at a temperature of 80° to 95° C for 10 hours. After the reaction was completed, the mixture was cooled to room temperature and rendered weakly alkaline with a dilute aqueous solution of sodium hydrocarbonate followed by steam-distillation to distill off any unreacted N-methylaniline. After the distillation, the reaction mixture was cooled to room temperature. The precipitate thus formed was filtered, washed with water, dried and recrystallized from toluene to obtain 10.3 g of bis(4-methylaminophenyl)-[2-(N-phenyl)carbamoyloxy-4-dimethylaminophenyl]-methane as pale bluish purple crystals.

The present invention will further be illustrated by reference to the following Examples, but it should be understood that the present invention is not to be construed as being limited to these examples.

EXAMPLE 1

Preparation of 4,4-bis(4'-Dimethylaminophenyl)-3-methyl-7-diethylamino-3H-1,3-benzoxazine-2-one and/or 4,4-bis(4'-Dimethylaminophenyl)-2-methylimino-7-diethylamino-1,3-benzodioxane 4.0 g of bis(4-dimethylaminophenyl)-[2-(N-methyl)-carbamoyloxy-4-diethylaminophenyl]-methane was dissolved in 80 ml of benzene, and 2.0 g of chloranil was added to the solution. The resulting mixture was allowed to react at a temperature of 40° to 45° C for 7 hours. After completion of the reaction, the reaction mixture was cooled to room temperature. The benzene layer was removed and washed successively with a dilute aqueous solution of sodium hydroxide and water followed by treatment with active carbon. The benzene was distilled off to obtain 3.0 g of a mixture of 4,4-bis(4'-dimethylaminophenyl)-3-methyl-7-diethylamino-3H-1,3-benzodioxane-2-one and 4,4-bis(4'-dimethylaminophenyl)-2-methylimino-7-diethylamino-1,3-benzodioxane as substantially colorless crystals having a melting point of 220° to 223° C. When the thus obtained crystals were allowed to stand in the atmosphere for a long period of time or when a solution of the crystals in dibenzyltoluene was exposed to direct sunlight for a long period of time, the crystals did not decompose or develop a color and no decrease in color developing ability was observed. A toluene solution of the crystals was adsorbed on acid clay or a phenol resin, and a pale blue color was developed several minutes later. The thus developed color changed into an intense blue color about 24 hours after the color formation. This intense blue color exhibited an extremely excellent water-resistance, light-fastness and anti-sublimation properties.

The IR spectrum of the crystals showed a strong absorption at 1720 cm$^{-1}$ ($>$C=O), at 1640 cm$^{-1}$ ($>$C—N—) and at 1100 cm$^{-1}$ (a lactone 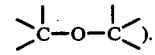).

2.0 g of the above obtained crystals was repeatedly recrystallized from benzene-petroleum ether (3:1 by volume) to obtain 0.3 g of 4,4-bis(4'-dimethylaminophenyl)-3-methyl-7-dimethylamino-3H-1,3-benzoxazine-2-one represented by the formula

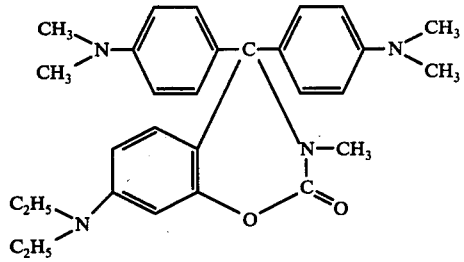

in high purity as substantially colorless crystals having a melting point of 215° to 217° C. The IR spectrum of these crystals showed a strong absorption at 1720 cm$^{-1}$ but no absorption at 1640 cm$^{-1}$ and 1100 cm$^{-1}$. A benzene solution of the thus obtained crystals developed a pale blue color immediately after adsorption on acid clay, which color changed to an intense blue several hours later.

The mother liquor which had been set aside after isolating the above described compound was repeatedly recrystallized from benzene-methanol-petroleum ether (5:2:1 by volume) to obtain 1.1 g of 4,4-bis(4'-dimethylaminophenyl)-2-methylimino-7-diethylamino-1,3-benzodioxane represented by the formula

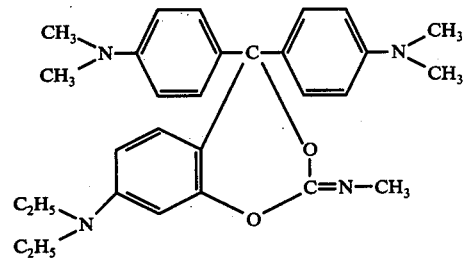

in high purity as substantially colorless crystals having a melting point of 222° to 224° C. The Ir spectrum of the crystals showed a strong absorption at 1640 cm$^{-1}$ and a weak absorption at 1720 cm$^{-1}$. A benzene solution of the crystals was adsorbed on acid clay. Several hours later a pale blue color was observed and 24 hours later the color changed to an intense blue.

EXAMPLE 2

Preparation of 4,4-bis(4'-Dimethylaminophenyl)-3-phenyl-7-diethylamino-3H-1,3-benzoxazine-2-one and/or 4,4-bis(4'-Dimethylaminophenyl)-2-phenylimino-7-diethylamino-1,3-benzodioxane 4.0 g of bis(4-dimethylaminophenyl)-[2-(N-phenyl)-carbamoyloxy-4-diethylaminophenyl]-methane was dissolved in 80 ml of benzene, and 1.8 g of chloranil was added to the solution. The resulting mixture was allowed to react at a temperature of 40° to 50° C for 7 hours, and the reaction product was worked up in the same manner as described in Example 1 to obtain 1.7 g of a mixture of 4,4-bis(4'-dimethylaminophenyl)-3-phenyl-7-diethylamino3H-1,3 -benzoxazine-2-one represented by the formula

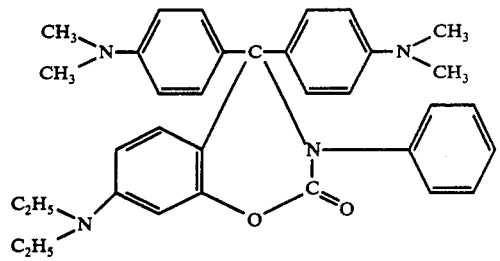

and 4,4-bis(4'-dimethylaminophenyl)-2-phenylimino-7-diethylamino-1,3-benzodioxane represented by the formula

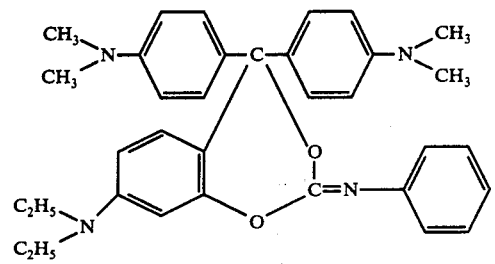

as a substantially colorless powder having a melting point of 204° to 206° C. A benzene solution of the thus obtained powder developed an intense blue color several hours after adsorption on acid clay. The color thus developed has an extremely excellent water-resistance, light-fastness and anti-sublimation properties.

1.0 g of the above obtained powder was repeatedly recrystallized from benzene-petroleum ether (3:1 by volume) in the same manner as described in Example 1 to obtain 0.9 g of 4,4-bis(4'-dimethylaminophenyl)-3-phenyl-7-diethylamino-3H-1,3-benzoxazine-2-one in high purity as substantially colorless crystals having a melting point of 206° to 207° C. The IR spectrum of this product showed a strong absorption at 1720 cm$^{-1}$ but almost no absorption at 1640 cm$^{-1}$ and 1100 cm$^{-1}$. A toluene solution of the above crystals developed an intense blue color about 2 hours after adsorption on acid clay.

EXAMPLES 3 to 5

The triphenylmethane derivative of the formula (II) indicated in Table II below was reacted in the same manner as described in Example 1 to obtain the color former of the formula (Ia) or (Ib) as shown in Table II below. The physical properties of the thus obtained color former and color developed with the color former are also shown in Table II below.

Table II

| Example No. | Triphenylmethane Derivative Represented by the Formula (II) | (amount used) | Color Former Represented by the Formula (Ia) or (Ib) | | | |
|---|---|---|---|---|---|---|
| | | | Yield (g) | Melting Point (° C) | Crystal Appearance | Color Developed on Acid Clay (solvent : benzene) |
| 3-1 | bis(4-Dimethylaminophenyl)-[2-(N-methyl)carbamoyloxyphenyl]-methane | (3.0 g) | 2.1 | 187–191 | 4,4-bis(4'-Dimethylaminophenyl-3-methyl-3H-1,3-benzoxazine-2-one and 4,4-bis(4'-Dimethylaminophenyl)-2-methylimino-1,3-benzodioxane  Pale greenish white | Intense bluish green |
| 3-2 | bis(4-Dimethylaminophenyl)-[2-(N-benzyl)carbamoyloxyphenyl]-methane | (1.0 g) | 0.3 | 230–234 | 4,4-bis(4'-Dimethylaminophenyl-3-benzyl-3H-1,3-benzoxazine-2-one and 4,4-bis(4'-Dimethylaminophenyl)-2-benzylimino-1,3-benzodioxane  Pale greenish white | Intense bluish green |
| 3-3 | bis(4-Dimethylaminophenyl)-[2-(N-4'-chlorophenyl)-carbamoyloxy-4-diethylaminophenyl]-methane | (2.0 g) | 1.6 | 219–223 | 4,4-bis(4'-Dimethylaminophenyl)-3-(4'-chloro)-phenyl-7-diethylamino-3H-1,3-benzoxazine-2-one and 4,4-bis(4'-Dimethylaminophenyl)-2-(4'-chloro)-phenylimino-7-diethylamino-1,3-benzodioxane  Pale bluish white | Intense blue |
| 3-4 | bis(4-Dimethylaminophenyl)-[2-(N-4'-methylphenyl)-carbamoyloxy-4-diethylaminophenyl]-methane | (2.0 g) | 1.8 | 184–188 | 4,4-bis(4'-Dimethylaminophenyl)-3-(4'-methyl)phenyl-7-diethylamino-3H-1,3-benzoxazine-2-one and 4,4-bis(4'-Dimethylaminophenyl)-2-(4'-methyl)phenylimino-7-diethylamino-1,3-benzodioxane  Pale bluish white | Intense blue |
| 3-5 | bis(4-Dimthylaminophenyl)-[2-(N-1'-naphthyl)carbamoyloxy-4-diethylaminophenyl]-methane | (2.0 g) | 1.6 | 195–201 | 4,4-bis(4'-Dimethylaminophenyl)-3-(1'-naphthyl)-7-diethylamino-3H-1,3-benzoxazine-2-one and 4,4-bis-(4'-Dimethylaminophenyl)-2-(1'-naphthyl)imino-7-diethylamino-1,3-benzodioxane  Pale bluish white | Intense blue |
| 3-6 | bis(4-Dimethylaminophenyl)-[2-(N-4'-methoxyphenyl)-carbamoyloxy-4-dibenzylaminophenyl]-methane | (1.0 g) | 0.4 | 171–176 | 4,4-bis(4'-Dimethylaminophenyl)-3-(4'-methoxy)-phenyl-7-dibenzylamino-3H-1,3-benzoxazine-2-one and 4,4-bis(4'-Dimethylaminophenyl)-2-(4'-methoxy)phenylimino-7-dibenzylamino-1,3-benzodioxane  Pale bluish white | Intense purplish blue |
| 3-7 | bis(4-Dimethylaminophenyl)-[2-(N-ethyl)carbamoyloxy-4-methoxyphenyl]-methane | (2.0 g) | 1.2 | 169–173 | 4,4-bis(4'-Dimethylaminophenyl)-3-ethyl-7-methoxy-3H-1,3-benzoxazine-2-one and 4,4-bis(4'-Dimethylaminophenyl)-2-ethylimino-7-methoxy-1,3-benzodioxane  Pale bluish white | Intense greenish blue |
| 3-8 | bis(4-Dimethylaminophenyl)-[2-(N-n-butyl)carbamoyloxy- | | | | 4,4-bis(4'-Dimethylaminophenyl)-3-n-butyl-7-diethylamino-3H-1,3-benzoxazine-2-one and 4,4-bis(4'- | |

Table II-continued

| | | | | | |
|---|---|---|---|---|---|
| | 4-diethylaminophenyl]-methane | Dimethylaminophenyl)-2-n-butylimino-7-diethylamino-1,3-benzodioxane | | | |
| | (2.0 g) | 1.3 | 197–199 | Pale bluish white | Intense blue |
| 3-9 | bis(4-Dimethylaminophenyl)-[2-(N-cyclohexyl)carbamoyloxy-4-diethylaminophenyl]-methane | 4,4-bis(4'-Dimethylaminophenyl)-3-cyclohexyl-7-diethylamino-3H-1,3-benzoxazine-2-one and 4,4-bis(4'-Dimethylaminophenyl)-2-cyclohexylimino-7-diethylamino-1,3-benzodioxane | | | |
| | (2.0 g) | 1.4 | 173–178 | Pale bluish white | Intense blue |
| 3-10 | bis(4-Dimethylaminophenyl)-[2-(N-benzyl)carbamoyloxy-4-diethylaminophenyl]-methane | 4,4-bis(4'-Dimethylaminophenyl)-3-benzyl-7-diethylamino-3H-1,3-benzoxazine-2-one and 4,4-bis(4'-Dimethylaminophenyl)-2-benzylimino-7-diethylamino-1,3-benzodioxane | | | |
| | (2.0 g) | 1.5 | 201–205 | Pale bluish white | Intense blue |
| 4-1 | bis(4-Dimethylaminophenyl)-[2-(N-allyl)carbamoyloxyphenyl]-methane | 4,4-bis(4'-Dimethylaminophenyl)-3-allyl-3H-1,3-benzoxazine-2-one and 4,4-bis(4'-Dimethylaminophenyl)-2-allylimino-1,3-benzodioxane | | | |
| | (3.0 g) | 1.2 | | Pale greenish white | Intense bluish green |
| 4-2 | bis(4-Dimethylaminophenyl)-[2-(N-i-butyl)carbamoyloxyphenyl]-methane | 4,4-bis(4'-Dimethylaminophenyl)-3-i-butyl-3H-1,3-benzoxazine-2-one and 4,4-bis(4'-Dimethylaminophenyl)-2-i-butylimino-1,3-benzodioxane | | | |
| | (3.0 g) | 1.8 | | Pale bluish white | Intense bluish green |

| Example No. | Triphenylmethane Derivative Represented by the Formula (II) (amount used) | Color Former Represented by the Formula (Ia) or (Ib) | Yield (%) | Crystal Appearance | Color Developed on Acid Clay (solvent : benzene) |
|---|---|---|---|---|---|
| 4-3 | bis(4-Dimethylaminophenyl)-1[2-(N-cyclohexyl)carbamoyloxyphenyl]-methane | 4,4-bis(4'-Dimethylaminophenyl)-3-cyclohexyl-3H-1,3-benzoxazine-2-one and 4,4-bis(4'-Dimethylaminophenyl)-2-cyclohexylimino-1,3-benzodioxane | | | |
| | (2.0 g) | | 0.9 | White | Intense bluish green |
| 4-4 | bis(4-Dimethylaminophenyl)-[2-(N-phenethyl)carbamoyloxyphenyl]-methane | 4,4-bis(4'-Dimethylaminophenyl)-3-phenethyl-3H-1,3-benzoxazine-2-one and 4,4-bis(4'-Dimethylaminophenyl)-2-phenethylimino-1,3-benzodioxane | | | |
| | (2.0 g) | | 1.0 | Pale greenish white | Intense bluish green |
| 4-5 | bis(4-Dimethylaminophenyl)-[2-(N- 4'-(N'-methyl-N'-phenyl)aminobenzyl carbamoyloxyphenyl]-methane | 4,4-bis(4'-Dimethylaminophenyl)-3-[4'-(N-methyl-N-benzyl)aminophenyl]-3H-1,3-benzoxazine-2-one and 4,4-bis(4'-Dimethylaminophenyl)-2-[4'-(N-methyl-N-benzyl)aminophenylimino]-1,3-benzodioxane | | | |
| | (3.0 g) | | 1.1 | Pale bluish greenish white | Intense bluish green |
| 4-6 | bis(4-Dimethylaminophenyl)-[2-(N-1'-naphthylmethyl)-carbamoyloxyphenyl]-methane | 4,4-bis(4'-Dimethylaminophenyl)-3-(1'-naphthylmethyl)-3N-1,3-benzoxazine-2-one and 4,4-bis(4'-Dimethylaminophenyl)-2-(1'-naphthylmethyl)imino-1,3-benzodioxane | | | |
| | (2.0 g) | | 0.5 | Pale greenish white | Intense bluish green |
| 4-7 | bis[4-(N-Methyl-N-benzyl)-aminophenyl]-[2-(N-ethyl)-carbamoyloxyphenyl]-methane | 4,4-bis[4-(N-Methyl-N-benzyl)aminophenyl]-3-ethyl-3H-1,3-benzoxazine-2-one and 4,4-bis[4-(N-Methyl-N-benzyl)aminophenyl]-2-ethylimino-1,3-benzodioxane | | | |
| | (2.0 g) | | 0.4 | Pale purple | Intense purplish blue |
| 4-8 | bis(4-Methylaminophenyl)-[2-(N-phenyl)carbamoyloxy-4-dimethylaminophenyl]-methane | 4,4-bis(4'-Methylaminophenyl)-3-phenyl-7-dimethylamino-3H-1,3-benzoxazine-2-one and 4,4-bis(4'-Methylaminophenyl)-2-phenylimino-7-dimethylamino-1,3-benzodioxane | | | |
| | (2.0 g) | | 0.5 | Pale purplish white | Intense bluish purple |
| 4-9 | bis(4-Dimethylaminophenyl)-[2-(N-3'-dimethylaminophenyl)-carbamoyloxy-4-dimethylaminophenyl]-methane | 4,4-bis(4'-Dimethylaminophenyl)-3-(3'-dimethylaminophenyl)-7-dimethylamino-3H-1,3-benzoxazine-2-one and 4,4-bis(4'-Dimethylamino)phenylimino-7-dimethylamino-1,3-benzodioxane | | | |
| | (2.0 g) | | 0.3 | Pale bluish white | Intense blue |
| 4-10 | bis(4-Diethylaminophenyl)-[2-(N-3'-nitrophenyl)carbamoyloxy-4,5-dimethylphenyl]-methane | 4,4-bis(4'-Diethylaminophenyl)-3-(3'-nitrophenyl)-7,8-dimethyl-3H-1,3-benzoxazine-2-one and 4,4-bis(4'-Diethylaminophenyl)-2-(3'-nitrophenyl)imino-7,8-dimethyl-1,3-benzodioxane | | | |
| | (2.0 g) | | 1.5 | Pale bluish white | Intense greenish blue |
| 4-11 | bis(4-Dimethylaminophenyl)-[2-(N-methyl)carbamoyloxy-4-(N-methyl-N-benzyl)aminophenyl]-methane | 4,4-bis(4'-Dimethylaminophenyl)-3-methyl-7-(N-methyl-N-benzyl)amino3H-1,3-benzoxazine-2-one and 4,4-bis(4-Dimethylaminophenyl)-2-methylimino-7-(N-methyl-N-benzyl)amino-1,3-benzodioxane | | | |
| | (3.0 g) | | 1.2 | Pale purplish bluish white | Intense purplish blue |
| 5-1 | bis(4-Dimethylaminophenyl)-[2-(N-4'-benzylphenyl)-carbamoyloxy-4,5-dichlorophenyl]-methane | 4,4-bis(4'-Dimethylaminophenyl)-3-(4'-benzylphenyl)-6,7-dichloro-3H-1,3-benzoxazine-2-one and 4,4-bis-(4'-Dimethylaminophenyl)-2-(4'-benzylphenyl)imino-6,7-dichloro-1,3-benzodioxane | | | |
| | (3.0 g) | | 1.5 | Pale greenish white | Intense greenish blue |
| 5-2 | bis(4-Dimethylaminophenyl)-[2-(N-4'-chloro-1'-naphthyl)-carbamoyloxy-4-ethoxyphenyl]- | 4,4-bis(4'-Dimethylaminophenyl)-3-(4'-chloro-1'-naphthyl)-7-ethoxy-3H-1,3-benzoxazine-2-one and 4,4-bis(4'-Dimethylaminophenyl)-2-(4'-chloro-1'- | | | |

Table II-continued

| | | | | |
|---|---|---|---|---|
| | methane | (3.0 g) | naphthyl)imino-7-ethoxy-1,3-benzodioxane | |
| | | | 0.8 White | Intense purple |
| 5-3 | bis(4-Dibenzylaminophenyl)-[2-(N-methyl)carbamoyloxy-4-dimethylaminophenyl]-methane | | 4,4-bis(4'-Dibenzylaminophenyl)-3-methyl-7-dimethylamino-3H-1,3-benzoxazine-2-one and 4,4-bis(4'-Dibenzylaminophenyl)-2-methylimino-7-dimethylamino-1,3-benzodioxane | |
| | | (3.0 g) | 0.7 Pale bluish white | Intense purple |
| 5-4 | bis[4-(N-Benzyl-N-phenyl)-aminophenyl]-[2-(N-phenyl)-carbamoyloxy-4-dimethylaminophenyl]-methane | | 4,4-bis[4'-(N-Benzyl-N-phenyl)aminophenyl]-3-phenyl-7-dimethylamino-3H-1,3-benzoxazine-2-one and 4,4-bis[4'-(N-Benzyl-N-phenyl)aminophenyl]-2-phenylimino-7-dimethylamino-1,3-benzodioxane | |
| | | (2.0 g) | 0.4 Pale bluish green | Intense greenish blue |
| 5-5 | bis[4-(N-4'-methylphenyl-N-methyl)aminophenyl]-[2-(N-methyl)carbamoyloxyphenyl]-methane | | 4,4-bis[4'-(N-4"-Methylphenyl-N-methyl)aminophenyl]-3-methyl-3H-1,3-benzoxazine-2-one and 4,4-bis[4'-(N-4"-Methylphenyl-N-methyl)aminophenyl]-2-methylimino-1,3-benzodioxane | |
| | | (3.0 g) | 2.1 Pale bluish green | Intense bluish green |

While the invention has been described in detail and with reference to specific embodiments thereof, it will be apparent to one skilled in the art that various changes and modifications can be made therein without departing from the spirit and scope thereof.

What is claimed is:
1. A mixture comprising:
a triphenylmethane compound represented by the formula

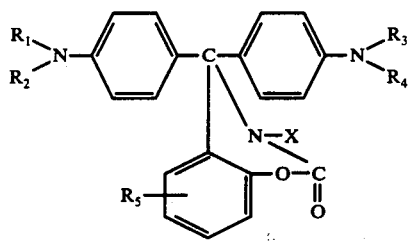

and,
a triphenylmethane compound represented by the formula

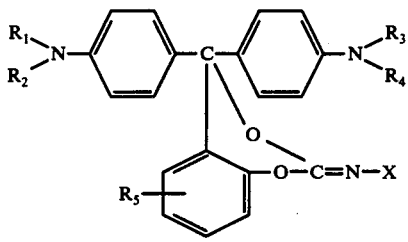

said compounds being present in amounts sufficient to form color;
wherein $R_1$ and $R_3$, which may be the same or different, each represents, a lower alkyl group having 1 to 4 carbon atoms, a benzyl group or a phenyl group, in which the aromatic nucleus of the benzyl and phenyl groups may be substituted with a lower alkyl group having 1 to 4 carbon atoms, a lower alkoxy group having 1 to 4 carbon atoms or a di-lower alkylamino group having 1 to 4 carbon atoms in each of the alkyl moieties thereof; $R_2$ and $R_4$, which may be the same or different, each represents a benzyl group or a phenyl group in which the aromatic nucleus of the benzyl and phenyl groups may be substituted with a halogen atom or a di-lower alkylamino group having 1 to 4 carbon atoms in each of the alkyl moieties thereof; $R_5$ represents a hydrogen atom, a lower alkyl group having 1 to 4 carbon atoms, a lower alkoxy group having 1 to 4 carbon atoms, a halogen atom, a di-lower alkylamino group having 1 to 4 carbon atoms in each of the alkyl moieties thereof, a dibenzylamino group, an N-lower alkyl-N-benzyl group having 1 to 4 carbon atoms in the alkyl moiety thereof or an N-lower alkyl-N-phenylamino group having 1 to 4 carbon atoms in the alkyl moiety thereof, in which the aromatic nucleus of the benzyl and phenyl groups may be substituted with a halogen atom, a lower alkyl group having 1 to 4 carbon atoms, or a lower alkoxy group having 1 to 4 carbon atoms; and X represents a lower alkyl group having 1 to 4 carbon atoms; a lower alkenyl group having 2 to 4 carbon atoms, a cyclohexyl group, an aralkyl group having 1 to 4 carbon atoms, in the alkyl moiety thereof or an aryl group, in which the aromatic nucleus of said aralkyl and aryl groups may be substituted with a lower alkyl group having 1 to 4 carbon atoms, a lower alkoxy group having 1 to 4 carbon atoms, a di-lower alkylamino group having 1 to 4 carbon atoms in each of the alkyl moieties thereof, a halogen atom, a nitro group, and when the aralkyl group is a benzyl group, the aromatic nucleus thereof may also be substituted with an N-lower alkyl-N-phenyl group having 1 to 4 carbon atoms in the N-lower alkyl moiety thereof.

* * * * *